Dec. 26, 1950　　　　H. G. MUELLER　　　　2,535,749
COMBINED STEAM ENGINE, COMPRESSOR, AND CONTROL THEREFOR
Original Filed June 8, 1943　　　　　　　　3 Sheets-Sheet 1
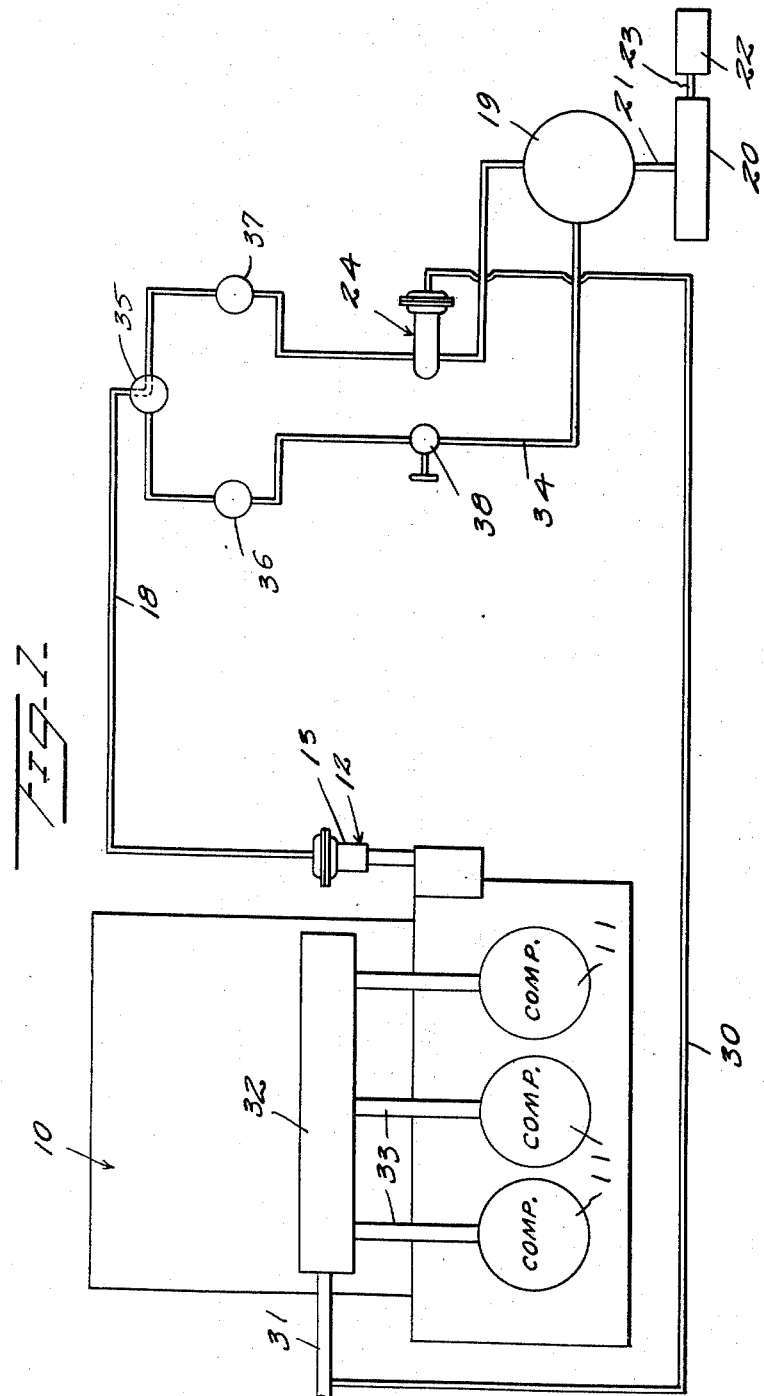
Inventor
H. G. Mueller
By Kimmel & Crowell
Attorneys Dec. 26, 1950   H. G. MUELLER   2,535,749
COMBINED STEAM ENGINE, COMPRESSOR, AND CONTROL THEREFOR
Original Filed June 8, 1943   3 Sheets-Sheet 2
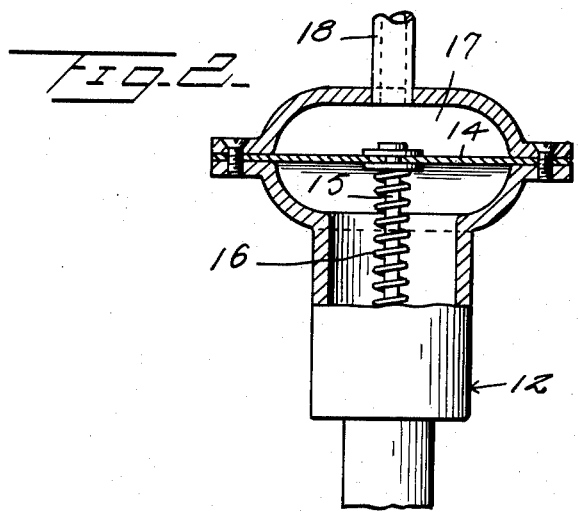
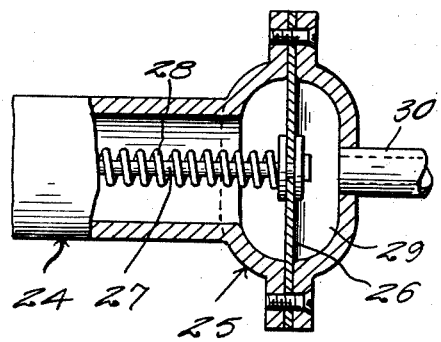
Inventor
H. G. Mueller
By Kimmel & Crowell
Attorneys

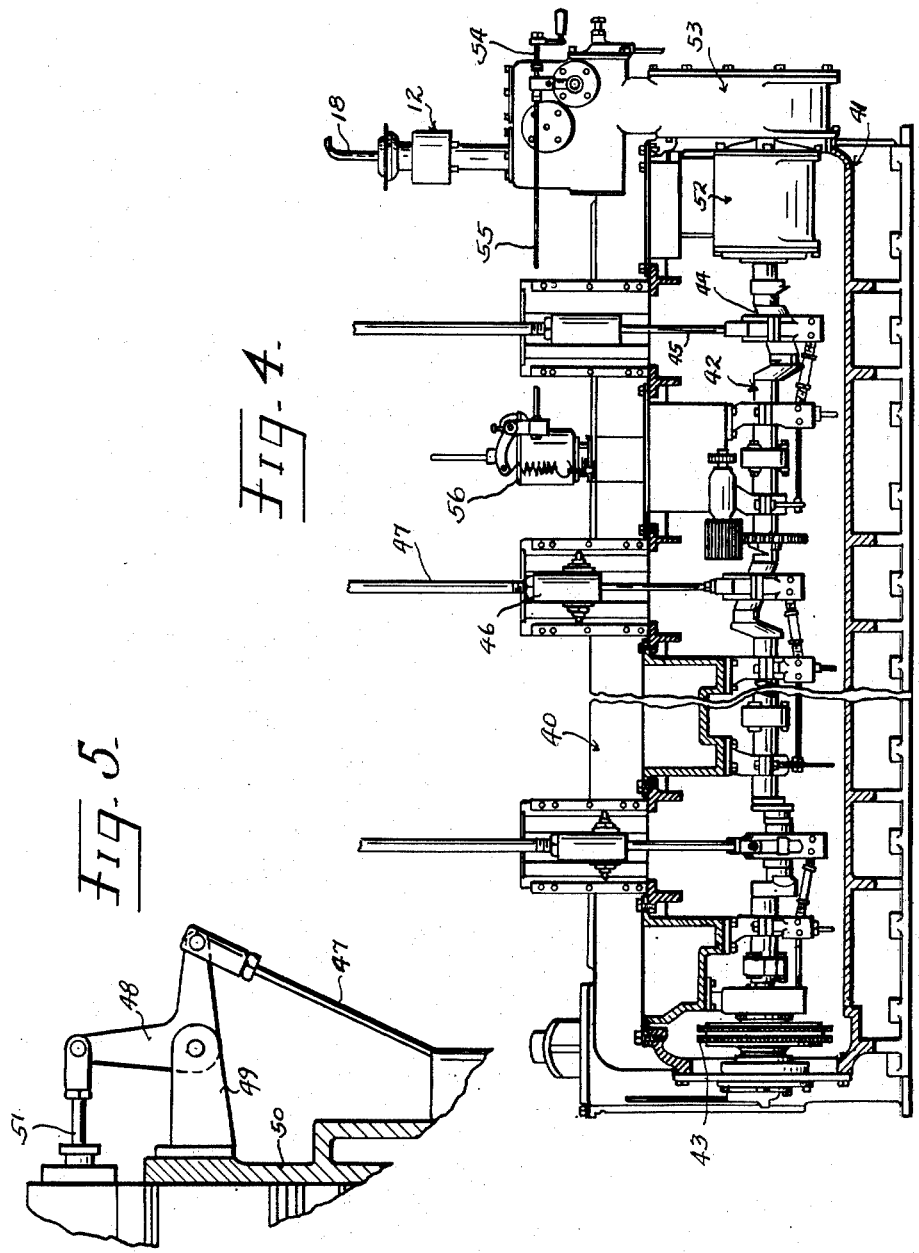

Patented Dec. 26, 1950

2,535,749

UNITED STATES PATENT OFFICE 2,535,749

COMBINED STEAM ENGINE, COMPRESSOR, AND CONTROL THEREFOR

Herman Gundert Mueller, Erie, Pa.

Original application June 8, 1943, Serial No. 490,071. Divided and this application May 10, 1945, Serial No. 593,050

6 Claims. (Cl. 230—9)

This invention relates to steam engines and is a division of my copending application Serial Number 490,071, filed June 8, 1943, for Valve Gear for Steam Engines, now abandoned.

An object of this invention is to provide in combination with a steam engine and compressor, an automatically operable means connected to the valve gear for the engine for regulating the operation in accordance with the demand for the air or gas compressed by the compressor.

Another object of this invention is to provide a master control for a steam engine by means of which the engine can be either automatically operated according to the demand, or may be normally regulated.

A further object of this invention is to provide in combination with a steam engine and a compressor operated thereby, a master control or regulator which is connected to the engine and the output side of the compressor, the master control being so constructed and arranged as to provide for increased engine operation when output pressure drops due to increased demand, and to decrease engine speed when output pressure increases due to decreased demand.

A further object of this invention is to provide a master control for a steam engine and compressor, which is connected to and operated by a pressure source independent from the engine and compressor, the master control including a regulating means connected to the output side of the compressor so as to regulate the master control operation in accordance with the increased or decreased demand on the output of the compressor, and also including a regulating means connected to the engine valve gear so as to adjust the valve gear and thereby automatically regulate the engine speed according to demand on the compressor.

To the foregoing objects and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a diagrammatic view of a master control or regulating means constructed according to an embodiment of this invention and connected with a steam engine and compressor.

Figure 2 is a fragmentary side elevation partly broken away and in section of the valve gear operator.

Figure 3 is a fragmentary side elevation partly broken away and in section of the regulating valve for the valve gear operator.

Figure 4 is a longitudinal section, partly broken away, of the valve gear associated with the steam engine and the control.

Figure 5 is a fragmentary vertical section of the main valve operated by the valve gear.

Referring to the drawing, the numeral 10 designates generally a steam engine and the numeral 11 designates a compressor which is connected to and driven directly by the engine 10. The engine 10 includes an adjustable valve gear structure as disclosed more fully in my copending application Serial Number 490,071, and this valve gear structure is automatically adjusted or operated by means of an adjusting member generally designated as 12.

The adjusting member 12 includes a housing 13, which has mounted therein a diaphragm 14 and a valve gear adjusting rod 15 is secured to the center of the diaphragm 15, and is connected to the valve gear structure for automatically adjusting the valve gear in accordance with the demand on the compressor 11, as will be hereinafter described.

The diaphragm 14 is constantly urged upwardly by means of a spring 16, which is adapted to adjust the valve gear in one direction when air or fluid pressure in the chamber 17 above the diaphragm 14 drops below a predetermined point. The chamber 17 has connected thereto a pipe 18 and the pipe 18 is connected at the opposite end thereof to an air pressure tank 19. The pressure of air in tank 19 is maintained at a predetermined pressure by means of a compressor 20, shown diagrammatically in Figure 1, which is connected to the tank 19 by means of a pipe 21. The compressor 20 may be a conventional compressor, and is operated by means of a power member 22 connected to the compressor 20 by means of a shaft 23.

An automatically operated pressure reducing valve 24 is interposed in the pipe 18 and includes a diaphragm housing 25, having a diaphragm 26 therein with which is connected a valve operating rod 27. A spring 28 is disposed about the rod 27 and bears against the diaphragm 26 so as to adjust the valve 24 in one direction. The diaphragm 26 forms a pressure chamber 29 on the outer side of the diaphragm 26 and a pipe 30 is connected at one end to chamber 29. The opposite end of pipe 30 is connected to a service pipe 31, which communicates with a manifold 32 connected by pipes 33 to the several compressors 11. In the present instance there are three of these compressors disclosed, and it will be understood that the engine 10 is formed of three cylinders, which may be either the simple or compound type of engines.

When pressure increases in the manifold 32 and the service pipe 31 due to decrease in demand for the gas or other fluid compressed by the compressors, this increased pressure will be communicated by pipe 30 to diaphragm chamber 29, thereby flexing diaphragm 26 inwardly and causing a reduction in the air pressure being communicated by pipe 18 from pressure source 19 to diaphragm chamber 17 of valve gear operator 12. In the event the gas or fluid pressure in service line 31 should be reduced by increased consumption of the gas or fluid, pipe 30 will communicate the reduced fluid pressure to diaphragm chamber 29 of regulating member 24 and spring 28 will move regulating rod 27 outwardly and thus increase the air pressure by opening valve structure 24 to diaphragm chamber 17. Increased pressure in chamber 17 will cause diaphragm 14 to flex inwardly and inward flexing of this diaphragm will effect adjustment of the valve gear structure in a manner to provide for increased speed of engine 10.

In this manner engine 10 and compressors 11 will operate under automatic regulation, the operation of the engine being dependent on the increase or decrease in the demand for the gas or fluid compressed by the compressors 11.

In order to provide for manual operation or regulation of the valve gear operator 12, I have provided a shunt pipe 34 which is connected at one end to the air pressure tank 19, and is connected at the other end to pipe 18 between reducing valve 24 and valve gear operator 12. A three-way valve 35 is disposed at the point of connection between pipe 34 with pipe 18, so that when it is desired to cut off the automatic operation of engine 10, valve 35 may be adjusted to provide for communicating pipe 18 with pipe 34, and from the latter to air tank 19. A pressure gauge 36 is interposed in pipe 34, and a second pressure gauge 37 is interposed in pipe 18 between valves 24 and 35. A manually operated valve 38 is interposed in pipe 34 between tank 19 and gauge 36, so that the pressure communicated from tank 19 to regulator or operator 12 may be manually controlled.

Referring now to Figure 4, there is disclosed the valve gear construction which is regulated by the control shown in Figure 1. An intermediate housing 40 is interposed between the cylinders and the crankcase of the steam engine and includes a valve gear housing 41 disposed on one side of and projecting laterally of the intermediate housing 40. A valve gear crankshaft 42 is journaled in the housing 41, being driven by driving sprockets 43 at one end of the crankshaft. The crankshaft 41 has mounted on the inclined offsets 44 thereof connecting rods 45 which are connected at their upper ends to sliding crossheads 46. The crossheads 46 have connected thereto an elongated link 47 which at its upper end is connected to a bellcrank 48 rockably mounted on a bracket 49 carried by the cylinder 50. The bellcrank 48 has connected thereto a valve stem 51 for reciprocating the valve upon rocking of the bellcrank 48.

The crankshaft 44 is adapted to be shifted endwise by means of a hydraulic operator 52 connected to the end of the crankshaft 42 opposite from the driving means 43. A control means generally designated as 53 is correlated with the hydraulic operator 52 and the control means 53 includes a pressure operator 12 which is connected by means of a pipe 18 to the valve 35. The control means 53 also includes a manual crank 54 which is connected by means of an elongated rod 55 to a centrifugal speed regulator 56.

In the use and operation of this control means, when the engine 10 is initially starting operation, valve 35 is turned so as to communicate operator 12 with tank 19, through pipe 18 and pipe 34. Valve 38 is then adjusted to provide for the desired valve gear adjustment through valve gear operator 12. After the engine 10 has started its operation and has picked up sufficient speed, valve 35 may be turned so as to communicate operator 12 with tank 19, through pipe 18 and automatic regulator or reducing valve 24.

In the event that the demand for gas or other fluid pressure compressed by the compressor 11 increases, resulting in a decrease of gas or fluid pressure in service line 31 and manifold 32, this decreased pressure will be communicated to chamber 29 and spring 28 will thereupon flex diaphragm 26 outwardly and adjust the reducing valve structure 24 so as to provide for increased air pressure from tank 19 to operator 12. This increased pressure in chamber 17 of operator 12 will move valve gear adjusting rod 15 inwardly, and inward movement of rod 15 will effect adjustment of the valve gear mechanism to provide for increased speed in engine 10 and similarly increased speed in compressors 11.

Where the demand for gas or fluid pressure decreases, this decreased demand will cause increased pressure in service line 31 and manifold 32, and this increased pressure will be communicated by pipe 30 to diaphragm chamber 29. The increased pressure in chamber 29 will cause diaphragm 26 to be flexed inwardly and inward movement of diaphragm 26 will cause rod 27 to move inwardly and thereby reduce the air pressure in line 18, which will act on diaphragm 14. Reduction in pressure in diaphragm chamber 17 will permit spring 16 to flex diaphragm 14 outwardly, and outward flexing of diaphragm 14 will move rod 15 outwardly in a direction to effect adjustment of the valve gear mechanism to provide for decreased engine speed.

With a control means for a combined steam engine and compressor unit, as hereinbefore described, the operation of the unit will be effected automatically so that a smooth operation of the unit will be provided and the necessary pressure generated in the compressor portion of the unit. In the event that for any reason the automatic mechanism hereinbefore described should become ineffective by breakdown in the independent pressure source, or from other causes, the engine 10 may be effectively operated by cutting out the automatic structure through adjustment of the three-way valve 35 and subsequent manual adjustment of valve 38.

What I claim is:

1. In combination a steam engine, a compressor coupled to and operated by said engine, said engine including a reciprocable operating valve for effecting the cyclic operation of the engine, valve gear connected to said valve for reciprocating the latter and for producing the cyclic steam events, means for adjusting said valve gear to thereby vary the reciprocal movement of said valve, said latter means including pressure actuated regulating means connected to the output side of said compressor and said valve gear adjusting means for adjusting said valve gear in accordance with the variation in pressure at the output side of said compressor.

2. The combination with a steam engine having an adjustable valve gear for producing the cyclic steam events in the engine operation and a compressor connected to and operated by said engine, of control means for effecting adjustment of said valve gear, said means comprising a valve gear adjusting member, spring means engageable with said member for operating said member in one direction, pressure operated means engageable with said member for operating said member in the opposite direction, a pipe connecting said member to a pressure source, a fluid regulating valve member interposed in said pipe, and a second pipe connecting said regulating member with the output side of said compressor whereby the operation of said regulating member will be effected by the pressure on the output side of said compressor.

3. The combination set forth in claim 2, including a shunt pipe connected to said pressure source and to said first named pipe between said valve gear adjusting member and said regulating member, and a three-way valve at the point of connection between said shunt pipe and said first named pipe.

4. In a steam engine, a cylinder, a piston slidable in said cylinder, a steam chest connected with said cylinder, a reciprocal control valve slidable in said chest and adapted to regulate the admission of steam to said cylinder, crank operated means connected to said valve for effecting reciprocation of said valve, said crank means including hydraulic means connected to said crank means for adjusting the latter to thereby vary the length of movement of said valve, a compressor coupled to said engine, and pressure operated means connected between the output side of said compressor and said hydraulic means whereby the latter will be rendered operative to adjust said crank means in proportion to the pressure at the output side of said compressor.

5. In a steam engine, a cylinder, a piston slidable in said cylinder, a steam chest connected with said cylinder, a reciprocal control valve slidable in said chest and adapted to regulate the admission of steam to said cylinder, crank operated means connected to said valve for effecting reciprocation of said valve, said crank means including hydraulic means connected to said crank means for adjusting the latter to thereby vary the length of movement of said valve, a compressor coupled to said engine, an auxiliary pressure means connected to said hydraulic means, a pressure operated valve interposed in the connection between said auxiliary means and said hydraulic, and means communicating said latter valve with the output side of said compressor.

6. In combination a steam engine including a cylinder, a piston slidable in said cylinder, a steam chest communicating with said cylinder, a reciprocable control valve slidable in said steam chest, a valve operating crank rotatably disposed at one side of said cylinder and connected to said engine for operation thereby, means connecting said crank with said valve to thereby reciprocate the latter, said crank shaft including offsets inclined to the length, means supporting said crankshaft for endwise adjustment, hydraulic means connected to said crankshaft for effecting endwise adjustment thereof to thereby vary the length of movement of said valve, a compressor coupled to said engine, a pressure means independent of said compressor and engine, means connecting said pressure means with said hydraulic means, a pressure operated regulating valve interposed in said connecting means, and a pipe connecting said latter valve with the output side of said compressor whereby said latter valve will be opened or closed in proportion to the pressure at the output side of said latter valve.

HERMAN GUNDERT MUELLER.

REFERENCES CITED

The following references are of record in the file of this patent:

UNITED STATES PATENTS

| Number | Name | Date |
| --- | --- | --- |
| 378,726 | Schuff | Feb. 28, 1888 |
| 603,425 | Cummings | May 3, 1898 |
| 669,669 | Squires | Mar. 12, 1901 |
| 830,972 | Copley | Sept. 11, 1906 |
| 977,486 | Thompson | Dec. 6, 1910 |
| 1,861,116 | Ernst | May 31, 1932 |